US008226857B2

(12) United States Patent
Vernooy et al.

(10) Patent No.: US 8,226,857 B2
(45) Date of Patent: *Jul. 24, 2012

(54) NON-LEAD RESISTOR COMPOSITION

(75) Inventors: Paul Douglas Vernooy, Hockessin, DE (US); Alfred T. Walker, Oxford, PA (US); Kenneth Warren Hang, Cary, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,660

(22) Filed: May 31, 2011

(65) Prior Publication Data
US 2011/0227003 A1 Sep. 22, 2011

Related U.S. Application Data

(62) Division of application No. 12/604,468, filed on Oct. 23, 2009, now Pat. No. 7,951,311, which is a division of application No. 12/105,683, filed on Apr. 18, 2008, now Pat. No. 7,608,206.

(51) Int. Cl.
*H01B 1/08* (2006.01)
(52) U.S. Cl. ............ 252/518.1; 423/641; 429/231
(58) Field of Classification Search ............ 252/518.1; 423/641; 429/231
See application file for complete search history.

(56) References Cited

U.S. PATENT DOCUMENTS

| 5,684,619 | A * | 11/1997 | Shabrang et al. ............ 359/273 |
| 7,585,474 | B2 * | 9/2009 | Wong et al. ............ 423/1 |
| 2007/0102427 | A1 | 5/2007 | Young |
| 2007/0184347 | A1 | 8/2007 | Stux et al. |

FOREIGN PATENT DOCUMENTS

| JP | 2001-266875 | 9/2001 |
| JP | 2002-101903 | 4/2002 |
| JP | 2002-198203 | 7/2002 |
| JP | 2003-197405 | 7/2003 |

OTHER PUBLICATIONS

Fukaya et al, "Highly Reliable and Lead (Pb) Free Thick Film Resistor Paste System for Low Thermal Expansion LTCC Application", 1997 International Symposium on Microelectronics, 1997, pp. 65-71.
Hormadaly, 2002 International Symposium on Microelectronics, "New Lead-Free Thick Film Resistors", IMAPS Symposia Proceedings, 2002, pp. 543-547.
James et al, "Structure and Bonding In Lithium Ruthenate", Li2Ru03, Journal of Solid State Chemistry 1988, vol. 74:287-294.
Kobayashi, Structure and Lithium Deintercalation of Li2-xRu03; Solid State Ionics 82 (1995) 25-31; Elsevier; New York.
Kim, Structural and Magnetic Properties of New Rocksalt-Related Compounds of Ruthenium Li2(M1/2Ru1/2)03, M=Fe, Co, Ni; Journal of Alloys and Compounds 201 (1993) 85-98; Elsevier-Sequoia; New York. Written Opinion of the International Searching Authority in PCT/US2009/040786; Jul. 17, 2009.
Kobayashi et al, Structure and Charge/Discharge Characteristics of New Layered Oxides, Li1.8Ru0.6Fe0.603 and Li2LR03, Journal of Power Sources 68, 1997, 686-691.
Feiner et al, The Magnetic Behavior of LiwM03 (M=Mn, Ru and Ir) and Li2(Mn1-xRux)03, Condensed Matter 2001, 1-10 arXiv:COND-MAT/0111211, Nov. 12, 2007.

* cited by examiner

*Primary Examiner* — Mark Kopec

(57) ABSTRACT

A non-lead composition for use as a thick-film resistor paste in electronic applications. The composition comprises particles of $Li_2RuO_3$ of diameter between 0.5 and 5 microns and a lead-free frit. The particles have had the lithium at or near primarily the surface of the particle at least partially exchanged for atoms of other metals.

16 Claims, 1 Drawing Sheet

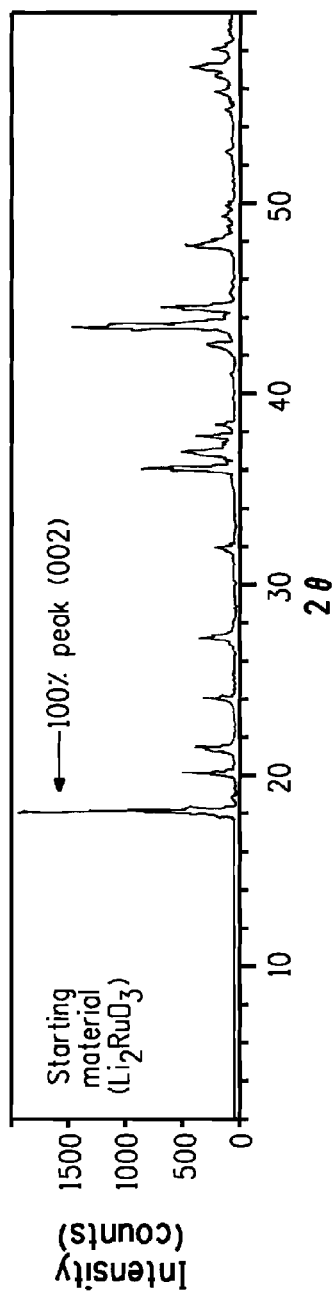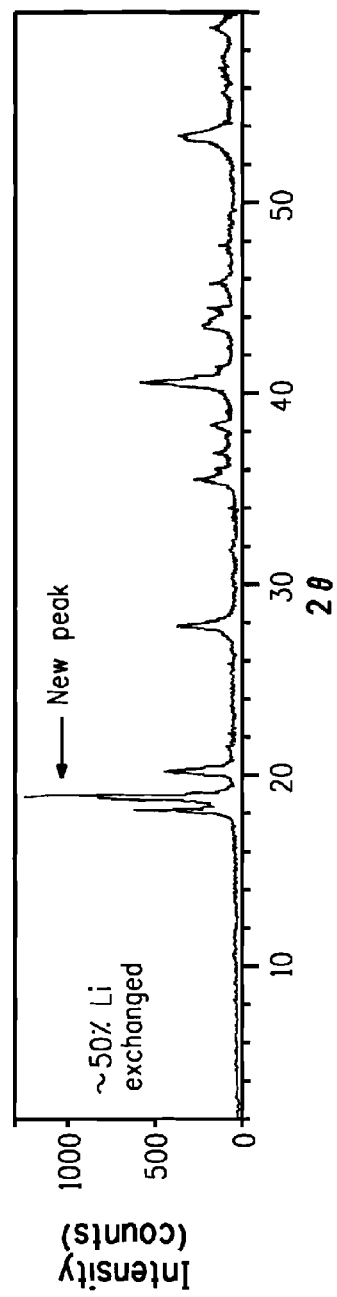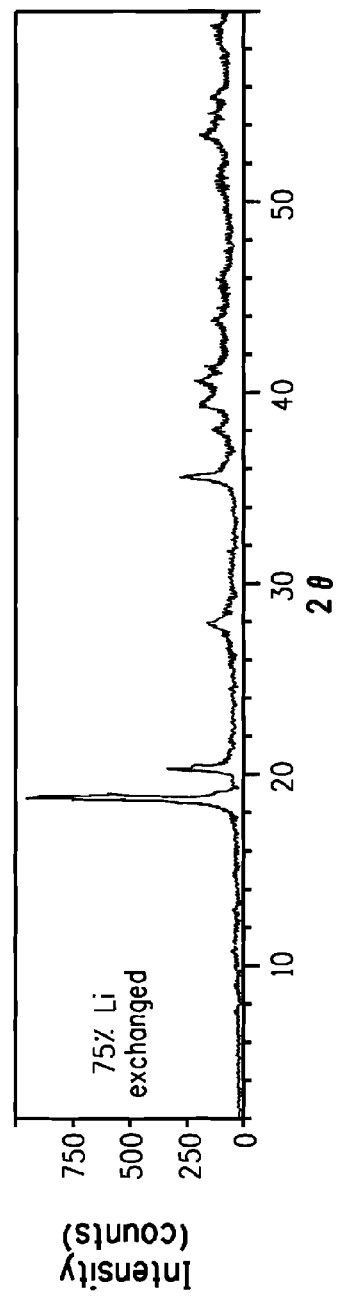

NON-LEAD RESISTOR COMPOSITION

This application is a division of and claims the benefit of U.S. application Ser. No. 12/604,468, filed Oct. 23, 2009 (now U.S. Pat. No. 7,951,311), which by this reference is incorporated in its entirety as a part hereof for all purposes; and which was a division of U.S. application Ser. No. 12/105,683, filed Apr. 18, 2008 (now U.S. Pat. No. 7,608,206).

TECHNICAL FIELD

This invention relates to a composition for use in the production of resistors for electronic applications. The composition is prepared from non-lead materials that include lithium and ruthenium, and may be prepared in the form of a thick-film paste.

BACKGROUND

Existing conductive intermediates (such as ruthenium dioxide, silver/palladium solid solutions, and bismuth ruthenate) combined with non-lead frits can form the low-resistance end of an essentially lead-free resistor system (10 to 1000 ohms), while existing conductives (such as ruthenium dioxide, bismuth ruthenate and strontium ruthenate) with non-lead frits could be used to make a 10 kilohm member. Ceramic resistor systems commonly include individual decade members which range between 10 ohms/square and 1 megohm/square. Resistors in these series must be insensitive enough to variations in thermal process conditions to be used on high speed manufacturing lines. Currently, most commercial resistor systems in the 100 kilohm to 1 megohm range utilize lead-containing frits and/or lead-containing conductive phases, such as formulations containing either lead ruthenate, or $RuO_2$ and high-lead frits.

Fukaya and Matsuo (1997, 97 ISHM Symposia Proceedings, pp. 65-71) describe a $RuO_2$/sodium alkaline-earth alumino-borosilicate frit resistor system that can be fired on alumina substrates or an LTCC system as described therein. The resistance of the system extends generally from 10 ohms to 500 kilohms. ±100 ppm/° C. TCRs are reported from 100 ohms to 500 kilohms.

Hormadaly (2002, 02 IMAPS Symposia Proceedings, pp. 543-547) describes resistors composed of $M_{2-x}Cu_xRuO_{7-\beta}$, where x is 0.2 to 0.4, β is 0 to 1, and M is a rare earth element. An example of a 6.15 megohm thick-film resistor is given.

Atsushi et al (2002, JP 2002-101903) describe a resistor composed of $RuO_2$ and a bismuth-bearing frit with or without bismuth ruthenate.

JP 2003-197405 describes $RuO_2$ and several ruthenates (such as $CaRuO_3$) combined with frits composed of many alkali and alkaline-earth borosilicates, and many transition metal drivers.

There nevertheless remains a need to find a non-lead conductive-oxide/frit combination that could provide resistor compositions in the 100 kilohm to 10 megohm range, and preferably with ±100 ppm/° C. TCRs.

BRIEF DESCRIPTION OF THE DRAWINGS

FIG. 1 shows X-ray powder diffraction patterns for $Li_2RuO_3$ with varying amounts of Li replaced with Al.

SUMMARY

In one embodiment, this invention provides a composition that includes particles of $Li_2RuO_3$ in which Li atoms have been exchanged for Al, Ga, K, Ca, Mn, Fe, H, Na, Cr, Co, Ni, V, Cu, Zn, or Ti atoms, or a combination thereof.

In another embodiment, this invention provides a composition described by formula as follows: $M^{+1}_xM^{+2}_yM^{+3}_zLi_{2-x-2y-3z}RuO_3$ where $(x+2y+3z) \leq 1.5$, and where M is selected from one or more members of the group consisting of Al, Ga, K, Ca, Mn, Fe, Na, H, Cr, Co, Ni, V, Cu, Zn, and Ti.

In a further embodiment, the above described compositions may be admixed with one or both of an alkali metal, zinc alumino-borosilicate frit, and an alkaline-earth metal, zinc alumino-borosilicate frit. The resulting composition may be fabricated as a resistor that has desirable sheet resistance and TCR properties, and the resistor so obtained may be used in an electronic device.

In yet another embodiment, this invention provides a method of preparing a $Li_2RuO_3$ composition by (a) providing $Li_2RuO_3$ particles having an average particle diameter between about 0.5 and about 5 microns; and (b) contacting the $Li_2RuO_3$ particles with a solution comprising ions prepared from one or more of the elements selected from the group consisting of Al, Ga, K, Ca, Mn, Fe, Na, H, Cr, Co, Ni, V, Cu, Zn, and Ti.

This invention provides a composition including particles of $Li_2RuO_3$ particles wherein the Li atoms at or near the particle surface have been replaced with atoms of other elements. Resistors comprising this material can be made which show high resistance and ±100 ppm/° C. TCRs without the use of toxic elements such as lead or cadmium.

The discovery that the conductive compositions disclosed herein are suitable to shift the electrical resistance to a greater extent than $RuO_2$ at the same conductive volume in a fired ceramic resistor formulation (employing, for example, glass, conductive and medium) makes possible a six- or seven-decade value resistor system in a lead-free chemistry.

DETAILED DESCRIPTION

This invention provides a chemically-modified lithium ruthenate conductive oxide. This material, when combined with an alkali- and/or alkaline-earth alumino-borosilicate frit, provides a composition that may be fabricated as an unencapsulated resistor having a desirably high-ohm sheet resistance, such as a sheet resistance in the range of about 100 kilohms per square to about 1 megohm per square, preferably in the range of about 100 kilohms per square to about 5 megohms per square, and more preferably in the range of about 100 kilohms per square to about 10 megohms per square. These resistors may also have TCR (thermal coefficient of resistance) values of ±100 ppm/° C.

The structure of $Li_2RuO_3$, as discussed in James and Goodenough, *Journal of Solid State Chemistry* 74, pp. 287-294, 1988, is composed in general of two adjacent, alternating layers, one layer containing only Li ions and the other containing both Ru and Li ions (ignoring the oxygen atoms). The Li-only layer is believed to contain about 75 mole % of the lithium in the structure, and these lithium ions may be readily removed via ion exchange. Although the lithium ions are mobile in the Li layer of $Li_2RuO_3$, cations which have higher valence than Li (such as $Mg^{+2}$ or $Al^{+3}$) are less mobile because of their higher charge and concomitant stronger bonding. Thus, while the invention is not limited to any particular theory of operation, it is believed that the exchanging ion, such as magnesium, first displaces lithium ions at or near the surface of the particle, and in the layer that is Li-only, and remains in essentially that position. The more magnesium ions that are available to exchange with the lithium ions, however, the deeper into the particle the magnesium ions will travel until all the exchangeable lithium has been removed or the magnesium ions in solution are exhausted. When Li ions in the Li-only layer are replaced by an amount of exchanging ions that is not significantly greater than the amount of Li ions in that layer, this tends to produce from the Li layer a surface shell of the exchanging ion, and produce an internal core of remaining lithium ions.

Because the lithium ions are being substituted for ions of different charges and/or charge densities, the layer spacing in the ion-exchanged portion of the $Li_2RuO_3$ crystal will change. Cations with a higher charge, such as magnesium and aluminum, will tend to decrease that layer spacing. The location of the (002) line in the X-ray powder diffraction pattern of a composition in which Li is replaced by Al reflects this shrinkage by shifting to higher $2\theta$, as shown in FIG. 1. In contrast, cations with lower charge densities, such as Na, will shift the (002) line to lower $2\theta$. Note in FIG. 1 how the largest (100%) peak in the starting material [the (002) peak at ~18° $2\theta$] shrinks with the extent of the ion exchange, and the new peak (~19° $2\theta$) grows in. Once all the lithium in the lithium-only layer is removed (at about 75 mole % Li ion exchange), the original 100% peak is gone.

To effect the exchange of Li ions in $Li_2RuO_3$, particles of $Li_2RuO_3$ are preferably milled to a diameter in the range of between about 0.5 and about 5 microns, which is a size range that is generally suitable for later screen printing to form a resistor. Any wet or dry milling technique can be used to effect size reduction of the $Li_2RuO_3$ particles, such as vibratory milling, ball milling, hammer milling, bead milling, rod milling, jet milling, or disk milling. The milling step can be performed sequentially prior to, or simultaneously while, the ion exchange step is being performed. The milling and ion exchange steps can be performed in separate vessels, or in the same vessel.

In a particularly preferred embodiment, however, in order to preserve what is essentially a core-shell arrangement between a formerly Li-only layer that has been exchanged, the adjacent Li/Ru layer, and the adjacent, next alternating Li-only layer, the milling of the particles should be complete, or substantially complete, before the ion-exchange step. If the ion-exchange step takes place before the milling step, the lithium-containing cores of the particles will be broken open and exposed to direct contact with the frit, and a resistor made from the resulting composition will very likely not have the desirable properties that characterize resistors made from the compositions hereof.

In an alternative embodiment, this invention provides a composition described generally by formula as follows: $M^{+1}_xM^{+2}_yM^{+3}_zLi_{2-x-2y-3z}RuO_3$ where $(x+2y+3z) \leq 1.5$, and where M is selected from one or more members of the group consisting of Al, Ga, K, Ca, Mn, Fe, Na, H, Cr, Co, Ni, V, Cu, Zn, and Ti.

The formulae shown above describes each and all of the separate, individual compounds that can be formed in that formula by (1) selection from within the prescribed range for one of the variable ions or numerical coefficients while all of the other variable ions or numerical coefficients are held constant, and (2) performing in turn the same selection from within the prescribed range for each of the other variable ions or numerical coefficients with the others being held constant. In addition to a selection made within the prescribed range for any of the variable ions or numerical coefficients of only one of the members of the group described by the range, a plurality of compounds may be described by selecting more than one but less than all of the members of the whole group of ions or numerical coefficients. When the selection made within the prescribed range for any of the variable ions or numerical coefficients is a subgroup containing (i) only one of the members of the whole group described by the range, or (ii) more than one but less than all of the members of the whole group, the selected member(s) are selected by omitting those member(s) of the whole group that are not selected to form the subgroup. The compound, or plurality of compounds, may in such event be characterized by a definition of one or more of the variable ions or numerical coefficients that refers to the whole group of the prescribed range for that variable but where the member(s) omitted to form the subgroup are absent from the whole group.

During the ion-exchange step, the particles are agitated, by stirring or milling or other suitable means, in a solution containing ions of Al, Ga, K, Ca, Mn, Fe, Na, H, Cr, Co, Ni, V, Cu, Zn, Ti, or mixtures thereof. The ions are obtained by dissolving a soluble salt of the desired element in a suitable solvent, preferably water or a mixture of water and a water-miscible solvent, such as an organic liquid such as methanol. Upon exposure to the salt solution, lithium atoms within the $Li_2RuO_3$ particles are replaced with cations from the solution. Suitable salts may be purchased commercially from suppliers such as Alfa Aesar (Ward Hill, Mass.), City Chemical (West Haven, Conn.), Fisher Scientific (Fairlawn, N.J.), Sigma-Aldrich (St. Louis, Mo.) or Stanford Materials (Aliso Viejo, Calif.). Suitable salts are nitrates, acetates, chlorides, fluorides, nitrites, sulfates, carbonates, or others which have solubility in the solvent used. The amount of lithium that is removed from the starting material can be controlled in terms of the amount of metal ions provided to be available for ion exchange, up to and including about 75 mole % removal of the lithium. Typical removal is in the range of about 25 mole % to about 60 mole % of the amount of Li ions in the starting material. For example, half a mole of divalent ions will displace a mole of Li ions, and a third of a mole of trivalent ions will displace a mole of Li ions. If water is used as the solvent, protons from the water can also displace some lithium in the lithium ruthenate. Thus, the lithium removed can be slightly more than what would be stoichiometrically expected from the quantity of metal salts used in the ion-exchange process.

The ion exchange process can be run for a period of time (typically less than 24 hours) that has been determined, on average, to be required to obtain ion exchange in the $Li_2RuO_3$ composition to a desired extent; or the progress of the exchange process can be monitored by analysis of the increasing concentration of lithium in the solution. Such analysis can be performed, for example, by induction coupled plasma-optical emission spectroscopy. Alternatively, the depletion of the ion-exchanging cation, such as magnesium, can be monitored to signal the end of the process, such as the case where, for example, the metal salt was the limiting reagent. The sample would then be washed to remove any remaining salts. Washing can be done by any convenient means, either in batch or continuous modes, including centrifugation, decantation, re-suspension, filtration, or combinations thereof. The washed particles are then dried, and, if desired, deagglomerated by sieving.

To make a resistor, dried particles of an exchanged $Li_2RuO_3$ composition may be mixed with one or more glass materials known as frits. Frits suitable for preparation of a composition from which a resistor may be fabricated herein include one or both of an alkali metal, zinc alumino-borosilicate frit, and an alkaline-earth metal, zinc alumino-borosilicate frit, including without limitation the compositions described in the following Table 1, but this list should be taken as representative only and not exhaustive. Frits such as those described in Table 1 may be acquired commercially from a variety of suppliers such as those named above.

TABLE 1

Glass Compositions (all values are in weight %).

| No. | SiO2 | Al2O3 | ZnO | CuO | BaO | MgO | Na2O | Li2O | P2O5 | B2O3 | K2O | TiO2 | SrO |
|---|---|---|---|---|---|---|---|---|---|---|---|---|---|
| 1 | 55.14 | 2.16 | 28.95 | 1.72 | | | 10.03 | | 2 | | | | |
| 2 | 51.42 | 6.4 | 28.61 | 1.7 | | | 9.91 | | 1.96 | | | | |
| 3 | 35.65 | 8.75 | 36.84 | 1.86 | 5.98 | 2.52 | 4.84 | 0.23 | 3.32 | | | | |
| 4 | 64 | 8.5 | 14.5 | | | 1 | 12 | | | | | | |
| 5 | 61 | 8.5 | 14.5 | 3 | | 1 | 12 | | | | | | |
| 6 | 68 | 14.5 | 8.5 | | | 1 | 8 | | | | | | |
| 7 | 55.98 | 2.1 | 28.18 | 3.94 | | | 7.82 | | 1.99 | | | | |
| 8 | 61.14 | 4.56 | | | 7.49 | | 2.52 | | | 6.8 | 2.3 | | 15.18 |
| 9 | 60.07 | 3.67 | | | 7.36 | | | | | 6.68 | 6.03 | 1.28 | 14.92 |

Frits suitable for use in this invention typically have an average particle size in the range of about 0.5 to about 1.5 µm, and preferably in the range of about 0.8 to about 1.2 µm. These frits are suitable for firing to prepare a resistor at a temperature in the range of about 800 to about 900° C., and more typically in the range of about 825 to about 875° C. Frits suitable for use herein may be produced by conventional glass-making techniques. Glasses were prepared, for example, in 500 to 1000 gram quantities from metal oxide and carbonate raw materials. Typically, the ingredients are weighed and mixed in the desired proportions, and then heated in a bottom-loading furnace to form a melt in platinum alloy crucibles. Heating is conducted to a peak temperature (frequently about 1400 to about 1600° C.) and for a time such that the melt becomes entirely liquid and homogeneous. The molten glass is quenched between counter-rotating stainless steel rollers to form a 10 to 15 mil (0.25 to 0.38 mm) thick platelet of glass. The resulting glass platelets are then milled (typically in water and then dried) to form a powder with a d50 (50% volume distribution) between 0.8 and 1.5 microns when measured with an instrument such as a Microtrac X100 Laser Particle Size Analyzer (Montgomeryville, Pa.).

The mixture of exchanged $Li_2RuO_3$ particles and frit can be fabricated into a resistor by making a thick-film paste. Typically, the paste contains conductive particles, glass powder, and optional additives dispersed in an organic medium to produce a screen-printable paste. The resistance of individual resistor pastes can be varied by adjusting the content of the conducting phase in the resistor compositions, and by varying the weight ratio of the frits and conductive phases present in the composition. The content of the conductive phase of a composition may be adjusted in the same manner as is known for conventional conductive compositions wherein, for example, the content of Ag/Pd solid solution powders is adjusted for resistors having a sheet resistance of less than about 10 ohms/sq., and the content of $RuO_2$ is adjusted for resistors having a sheet resistance equal to or greater than about 10 ohms/sq. Using an exchanged lithium ruthenate composition as the conductive phase and glass compositions from Table 1, sheet resistances between 100 kilohms/sq. and 1 megohm/sq. can be achieved with loadings of the conductive phase in the range of between about 15 and about 20 weight percent of the paste composition. The content of the conductive phase and the frits together typically constitutes about 70 weight % of the paste composition.

The inorganic components are typically mixed with an organic medium by mechanical mixing to form the type of viscous compositions known as a paste, and an important property of the paste is that it has a consistency and rheology suitable for screen printing. A wide variety of inert viscous materials can be used as the organic medium. The organic medium must be one in which the inorganic components are dispersible with stability. The rheological properties of the medium must be such that they lend properties to the composition useful for printing, including: a stable dispersion of solids, a viscosity and thixotropy that is screen printable, ability to wet the substrate and the paste solids, short drying rate, and stability during firing. The organic medium used in a thick-film composition formed from a $Li_2RuO_3$ composition hereof is preferably a non-aqueous inert liquid. Use can be made of any of various organic media, which may or may not contain thickeners, stabilizers, and/or other conventional additives. The organic medium is typically a solution of polymer(s) in solvent(s). Additionally, a small amount of additives, such as surfactants, may be a part of the organic medium. The most frequently used polymer for this purpose is ethyl cellulose. Other examples of suitable polymers include ethyl hydroxyethyl cellulose, wood rosin, mixtures of ethyl cellulose and phenolic resins, polymethacrylates of lower alcohols, and monobutyl ether of ethylene glycol monoacetate. The most widely used solvents found in thick-film compositions are ester alcohols and terpenes such as alpha- or beta-terpineol or mixtures thereof with other solvents such as kerosene, dibutylphthalate, butyl carbitol, butyl carbitol acetate, hexylene glycol, and high-boiling alcohols and alcohol esters. In addition, volatile liquids for promoting rapid hardening after application on the substrate can be included in the medium. Suitable surfactants for lithium ruthenate-based resistors include soya lecithin and alkali phosphates. Various combinations of these and other solvents are formulated to obtain the viscosity and volatility requirements desired.

The polymer present in the organic medium is typically at a content in the range of about 8 weight % to about 11 weight % of the total composition. A thick-film resistor composition of this invention may be adjusted to a predetermined, screen-printable viscosity with the organic medium. The ratio of organic medium in the thick-film composition to the inorganic components in the dispersion may be adjusted in terms of the ability of the printing equipment to handle a particular viscosity, thixotropy, and volatility as influenced by the kind of organic medium used. Usually, the dispersion will contain about 70 to about 95 weight % of inorganic components and about 5 to about 30 weight % of organic medium in order to obtain good wetting.

The powders are wetted by the organic medium by mechanical mixing. Small samples can be hand mixed on a glass surface with a spatula, but impeller stirrers are typically used for larger volumes of paste. Final mixing and dispersion of powder particles is accomplished by the use, for example, of a three-roll mill such as the Ross (Hauppauge, N.Y.) three-roll mill [floor model with 4 inch (10.16 cm) diameter×8 inch (20.32 cm) long rolls]. A final paste viscosity between about 150 and about 300 Pa-sec. [as measured, for example, at 10 rpm and 25° C. with a Brookfield HBF viscometer (Middleboro, Mass.) with #6 spindle] is suitable for screen printing. Screen printing may be accomplished, for example, by use of an automatic screen printer (such as those from Engineering Technical Products, Sommerville, N.J.). Either 200 or 325 mesh stainless steel screens may be used to achieve resistor dried thickness of 18 microns (on resistors with 0.8 mm length and width). The resistors may be printed on 1 inch (2.54 cm) squares of 96% alumina substrates. Substrates such as those that are 25 mils (0.635 mm) in thickness, as are produced by CoorsTek (Golden, Colo.), may be used for printing. The resistors may be printed on a pattern of Ag thick-film terminations which have been previously fired to 850° C. DuPont 5426 terminations that have been fired using the recommended 30 minute firing profile with 10 minutes at the peak firing temperature (DuPont MicroCircuit Materials, Wilmington, Del.) are suitable. Resistors may also be fired at 850° C. using a 30 minute profile with 10 minutes at the peak temperature. A furnace such as a Lindberg Model 800 (Riverside, Mich.) 10-zone belt furnace with 233.5 inch (593.1 cm) belt length may be used for all firings.

The pastes may additionally contain one or more components selected from CuO, $P_2O_5$, and $TiO_2$.

In various alternative embodiments, this invention provides a composition comprising particles of $Li_2RuO_3$ in which Li atoms have been exchanged for Al, Ga, K, Ca, Mn, Fe, H, Na, Cr, Co, Ni, V, Cu, Zn, or Ti atoms, or a combination thereof. In the composition, at least 50 mol % of the Li atoms may be exchanged, or at least 75 mol % of the Li atoms may be exchanged.

In the composition, a $Li_2RuO_3$ particle may comprise first and second layers, and more Li atoms may be exchanged in the first layer than in the second layer. For example, essentially all (e.g., more than 80%, more than 90%, more than 95% or more than 99%) of the Li atoms in the first layer may be exchanged, and/or essentially none (e.g. less than 20%, less than 10%, less than 5%, or less than 1%) of the Li atoms in the second layer may be exchanged. The first and second layers may be adjacent. The second layer may also be adjacent on its other side to a third layer in which more Li atoms may be exchanged than in the second layer, or in which essentially all of the Li atoms may be exchanged.

In the composition, an atom exchanged for Li may have a 2+ valence, or may have a 3+ valence. An atom exchanged for Li may comprise one or more members of the group consisting of Al, Cu, Mg, Zn, Fe, Ga and Mn. The composition may contain less than 100 ppm, less than 50 ppm, or less than 10 ppm lead.

A resistor may be prepared from any of the compositions according to this invention, and an electronic device such as a circuit board may be prepared using such a resistor.

Also provided by this invention is a method of preparing a $Li_2RuO_3$ composition by (a) providing $Li_2RuO_3$ particles having an average particle diameter between about 0.5 and about 5 microns; and (b) contacting the $Li_2RuO_3$ particles with a solution comprising ions prepared from one or more of the elements selected from the group consisting of Al, Ga, K, Ca, Mn, Fe, Na, H, Cr, Co, Ni, V, Cu, Zn, and Ti.

In such a method, the $Li_2RuO_3$ particles may be milled to an average particle diameter between about 0.5 and about 5 microns prior to being contacted with the solution of ions, or the $Li_2RuO_3$ particles may be milled to an average particle diameter between about 0.5 and about 5 microns while being contacted with the solution of ions. Also in this method, the $Li_2RuO_3$ particles may be contacted with the solution of ions in the presence of a solvent comprising either water, or a mixture of water and a water-miscible organic liquid. And the method may also include the steps of (c) washing the resulting particles free of soluble salts; (d) drying the washed particles; and (e) deagglomerating the dried particles, such as by sieving.

Particle size herein may be determined according to methods as disclosed in U.S. 2007/0102427, which is by this reference incorporated in its entirety as a part hereof for all purposes.

EXAMPLES

The advantageous attributes and effects of the compositions and methods hereof may be seen in a series of examples (Examples 1~13), as described below. The embodiments of these compositions and methods on which the examples are based are representative only, and the selection of those embodiments to illustrate the invention does not indicate that materials, conditions, components, reactants, ingredients, techniques or protocols not described in these examples are not suitable for practicing these compositions and methods, or that subject matter not described in these examples is excluded from the scope of the appended claims and equivalents thereof. The significance of the examples is better understood by comparing the results obtained therefrom with the results obtained from a trial run that is designed to serve as a controlled experiment (Control A) and provide a basis for such comparison since direct mixing of components was used in Control A rather than ion exchange.

In the examples, $RuO_2$ was obtained from Colonial Metals (Elkton, Md.). The defoamer (Surfynol® DF-58) was obtained from Air Products (Allentown, Pa.). All other chemicals were obtained from Sigma-Aldrich (St. Louis, Mo.). The milling jars and media were obtained from Paul O. Abbe (Bensenville, Ill.). The media were ⅜" cylinders or 2 mm spheres of yttria-stabilized zirconia.

Example 1

Synthesis of $Li_2RuO_3$ $Li_2CO_3$ and $RuO_2$ were dried at 100° C. overnight before use. 54.42 g $Li_2CO_3$ and 97.99 g $RuO_2$ were put into a 1 liter rubber-lined milling jar half full of ⅜" media (1700 g). The jar was rolled at 80 rpm for 24 hours. The contents were sieved to remove the media, and the powder was placed into shallow alumina trays. The trays were heated at 1000° C. for 12 hours in air. This synthesis yielded approximately 120 g of $Li_2RuO_3$. Powder X-ray diffraction confirmed the presence of $Li_2RuO_3$ with no impurity phases.

Example 2

Al Ion Exchange 100 g of $Li_2RuO_3$ prepared as in Example 1 was put into a 1 liter rubber-lined milling jar with 1700 g of ⅜" media. Sufficient water was added to just cover the media and powder. Defoamer (~1.5 g) was also added to prevent foaming. The jar was rolled at 80 rpm for 48 hours. Then the jar was opened and 76.81 g of $Al(NO_3)_3.9H_2O$ was added. Additional water was also added to fill the jar about three-quarters full (to minimize additional milling of the particles). Rolling was continued another 24 hours. The contents of the mill were screened to separate the slurry from the media, and the jar and the media were washed to recover the sample. The slurry and the washings were combined and centrifuged. The supernate (#1) was decanted; it weighed 1133 g. Additional water was added to the solids, and the solids were redispersed. The slurry was centrifuged again. The supernate (#2) was decanted; it weighed 1301 g. Methanol was added again, and the solids were redispersed. The slurry was centrifuged again, and the supernate was decanted (#3); it weighed 1040 g. The solids were dried at 70° C. under vacuum and sieved to −325 mesh.

The three supernates were analyzed for Li, Al, and Ru by ICP-OEP (induction coupled plasma-optical emission spectroscopy) using a Perkin Elmer Optima 5300 V (Waltham, Mass.). The lithium concentration decreased from 2985 ppm in #1 to 245 ppm in #2 to 115 ppm in #3. The aluminum concentration was 8 ppm in #1, 3 ppm in #2, and undetected (<1 ppm) in #3. Ruthenium was undetected (<1 ppm) in all three solutions. By using the lithium concentrations in the three supernates and their weights, it is possible to calculate the total weight, and thus weight percent, of lithium removed. In this case, 45% of the lithium originally present was removed and replaced by aluminum. These data demonstrate that the aluminum displaces about half of the lithium in the sample, cannot be washed out, and remains firmly bound within the structure. The resulting compound, $Al_{0.3}Li_{1.1}RuO_3$, was analyzed with X-ray powder diffraction (see the middle pattern of FIG. 1). The pattern showed that what used to be the 100% peak of $Li_2RuO_3$ (~18.2° 2θ) is now lower in intensity, and a new peak has grown in at ~19° 2θ.

Example 3

Cu Ion Exchange

The synthesis in Example 2 was repeated, except 62.49 g of copper acetate dihydrate was substituted for the aluminum nitrate. ICP-OES analysis was similar to Example 2, in that Li decreased with each wash, and only trace amounts of Cu were detected in any of the supernates. By using the lithium concentrations in the three supernates and their weights, it is possible to calculate the total weight, and thus weight percent, of lithium removed. In this case, 52.9% of the lithium originally present was removed and replaced by copper. The resulting compound, $Cu_{0.5}LiRuO_3$, was analyzed with X-ray powder diffraction. The pattern showed that what used to be the 100% peak of $Li_2RuO_3$ (~18.2° 2θ) is now lower in intensity, and a new peak has grown in at ~19° 2θ.

Example 4

Mg Ion Exchange

The synthesis in Example 2 was repeated, except 65.66 g of magnesium acetate tetrahydrate was substituted for the aluminum nitrate. ICP-OES analysis of the supernates was similar to Example 2, in that Li decreased with each wash, and only trace amounts of Mg were detected in the supernates. By using the lithium concentrations in the three supernates and their weights, it is possible to calculate the total weight, and thus weight percent, of lithium removed. In this case, 49.66% of the lithium originally present was removed and replaced by magnesium. The resulting compound, $Mg_{0.5}LiRuO_3$, was analyzed with X-ray powder diffraction. The pattern showed that what used to be the 100% peak of $Li_2RuO_3$ (~18.2° 2θ) is now lower in intensity, and a new peak has grown in at ~19° 2θ.

Example 5

Zn Ion Exchange

The synthesis in Example 2 was repeated, except 68.64 g of zinc acetate dihydrate was substituted for the aluminum nitrate. ICP-OES analysis of the supernates was similar to Example 2, in that Li decreased with each wash, and only trace amounts of Zn were detected in the supernates. By using the lithium concentrations in the three supernates and their weights, it is possible to calculate the total weight, and thus weight percent, of lithium removed. In this case, 39.9% of the lithium originally present was removed and replaced by zinc. The resulting compound, $Zn_{0.4}Li_{1.2}RuO_3$, was analyzed with X-ray powder diffraction. The pattern showed that what used to be the 100% peak of $Li_2RuO_3$ (~18.2° 2θ) is now lower in intensity, and a new peak has grown in at ~19° 2θ.

Example 6

H Ion Exchange 81.47 g $Li_2RuO_3$, prepared as in Example 1, were put into a 1 liter rubber-lined milling jar with 1700 g of ⅜" media. A solution of 63.12 g 99.99% acetic acid and water, sufficient to just cover the media and powder, was added, and the jar was rolled 93 hours. The powder was isolated and washed as in Example 2. ICP-OES analysis of the supernates was similar to Example 2, in that Li decreased with each washing. By using the lithium concentrations in the three supernates and their weights, it is possible to calculate the total weight, and thus weight percent, of lithium removed. In this case, 69.77% of the lithium originally present was removed and replaced by protons. The resulting compound, $H_{1.40}Li_{0.6}RuO_3$, was analyzed with X-ray powder diffraction. The pattern showed that what used to be the 100% peak of $Li_2RuO_3$ (~18.2° 2θ) is now much lower in intensity (as nearly all of the Li in the Li-only layer has been removed), and a new peak has grown in at ~19° 2θ.

Example 7

Pre-Milling in Methanol Followed by Cu Ion Exchange 100 g of $Li_2RuO_3$ prepared as in Example 1 was put into a 1 liter nylon milling jar with 1700 g of ⅜" media. Sufficient methanol was added to just cover the media and powder. The jar was rolled for 6 days at 80 rpm. Then 30.69 g copper acetate monohydrate and 100 g water were added and the rolling continued for 24 additional hours. The pattern showed that what used to be the 100% peak of $Li_2RuO_3$ (~18.2° 2θ) is now lower in intensity, and a new peak has grown in at ~19° 2θ. ICP-OES analysis of the supernates was similar to Example 2, in that Li decreased with each washing. No copper was detected in any of the washes (<1 ppm). By using the lithium concentrations in the three supernates and their weights, it is possible to calculate the total weight, and thus weight percent, of lithium removed. In this case, 37.03% of the lithium originally present was removed and replaced by copper and protons.

Example 8

Cu and Al Ion Exchange 100 g of $Li_2RuO_3$ prepared as in Example 1 was put into a 1 liter rubber-lined milling jar with 1700 g of ⅜" media.

Sufficient water was added to just cover the media and powder. Defoamer (~1.5 g) was also added to prevent foaming. The jar was rolled at 80 rpm for 48 hours. Then the jar was opened and 61.67 g of $Al(NO_3)_3 \cdot 9H_2O$ and 14.27 g copper nitrate hemipentahydrate were added. Additional water was also added to fill the jar about three-quarters full (to minimize additional milling of the particles). Rolling was continued another 24 hours. The contents of the mill were screened to separate the slurry from the media, and the jar and the media were washed to recover the sample. The slurry and the washings were combined and centrifuged. The supernate (#1) was decanted. Methanol was added, and the solids were redispersed. The slurry was centrifuged again. The supernate (#2) was decanted. Additional methanol was added, and the solids were redispersed. The slurry was centrifuged again, and the supernate was decanted (#3). The solids were dried at 70° C. under vacuum and sieved to −325 mesh. ICP-OES of supernate #1 found 5 ppm Al and no Cu, showing that the ion-exchange process had proceeded until exhaustion of the added cations, resulting in a final composition of $Al_{0.267}Cu_{0.1}LiRuO_3$.

Example 9

Rate of Al Ion Exchange

This example demonstrates how rapidly the aluminum is exchanged with the lithium in the structure. 100 g of $Li_2RuO_3$, prepared as in Example 1, was placed into a 1 liter nylon milling jar with 1700 g of ⅜" media. Sufficient 2-heptanone was added to just cover the media and powder. The jar was rolled 96 h at 80 rpm. The sample was isolated with methanol. The slurry was centrifuged and the supernate was decanted. The solids were dried at 70° C. under vacuum. 90.82 g of this powder was placed into a 1 liter rubber-lined milling jar with 1700 g of ⅜" media. 70.15 g $Al(NO_3)_3 \cdot 9H_2O$ were dissolved in 100 g water and added to the jar. Additional water was added to just cover the media and the powder. 1.46 g defoamer was also added. The jar was rolled at 80 rpm and samples were taken at intervals for ICP-OES analysis. At 1 hour, the Al concentration was 3990 ppm. At 2 hours, the Al concentration was 2306 ppm. At 4 hours, the Al concentration was 40 ppm. At 6 hours, the Al concentration was less than 1 ppm.

Example 10

Fe Ion Exchange 12.38 g $Fe(NO_3)_3 \cdot 9H_2O$ was Dissolved in about 20 g of water. 10 g of $Li_2RuO_3$ was placed into a 125 ml plastic bottle with 250 g of 2 mm media. The iron solution was added with sufficient additional water to cover the media and powder. The bottle was placed inside a larger bottle so that it would tumble end-over-end as the larger bottle rolled. The sample was rolled for 70 h. The solids were isolated as in Example 2. X-ray diffraction of the resulting powder confirmed that the Fe ions had replaced a fraction of the Li ions, in that the 100% peak of $Li_2RuO_3$ was now smaller and a new peak had grown in at 19° 2θ.

Example 11

Ga Ion Exchange 7.90 g gallium nitrate hydrate was dissolved in about 20 g of water. 10 g of $Li_2RuO_3$ was placed into a 125 ml plastic bottle with 250 g of 2 mm media. The gallium solution was added with sufficient additional water to cover the media and powder. The bottle was placed inside a larger bottle so that it would tumble end-over-end as the larger bottle rolled. The sample was rolled for 70 h. The solids were isolated as in Example 2. X-ray diffraction of the resulting powder confirmed that the Ga ions had replaced a fraction of the Li ions, in that the 100% peak of $Li_2RuO_3$ was now smaller and a new peak had grown in at 19° 2θ.

Example 12

Mn Ion Exchange 10 g of $Li_2RuO_3$ was placed into a 125 ml plastic bottle with 250 g of 2 mm media. 18.05 g of a 9.32% Mn(II) nitrate solution was added with sufficient additional water to cover the media and powder. The bottle was placed inside a larger bottle so that it would tumble end-over-end as the larger bottle rolled. The sample was rolled for 70 h. The solids were isolated as in Example 2. X-ray diffraction on the resulting powder confirmed that the Mn ions had replaced a fraction of the Li ions, in that the 100% peak of $Li_2RuO_3$ was now smaller and a new peak had grown in at 19° 2θ.

Example 13

Resistor Formulation

Aluminum-exchanged $Li_2RuO_3$ (Example 2) was mixed on a three-roll mill with one or several glass frits. The frit or frit combination is lead free. The frit composition is in the range of 50 to 63 weight % $SiO_2$, 0 to 10% $Al_2O_3$, 0 to 10% $B_2O_3$, 10 to 30% ZnO, 0 to 3% CuO, 3 to 8% BaO, 5 to 10% $Na_2O$, 7 to 17% SrO, 0 to 3% $K_2O$, and 0 to 4% $P_2O_5$. The solid powders were mixed with an organic medium in accordance with the method described above. 70 weight % powder and 30 weight % organics were used. The organics consisted of a mixture of Aqualon T200 ethylcellulose (Hercules, Wilmington, Del.), terpineol, and soya lecithin. Paste viscosity was between 220 and 260 Pa.-sec.

The resulting paste was printed on an alumina substrate in a rectangular pattern, 0.8×0.8 mm length and width, and 18 microns dry thickness. Pre-fired 5426 Ag termination were used. The parts were fired in a Lindberg 10-zone belt furnace with peak firing temperature of 850° C. (10 minute duration at peak firing temperature). Fired thickness ranged between 10 to 14 microns. Electrical data for pastes with 14 and 16 weight % conductive are given below.

Resistances are measured at −155, 25, and 125° C. using a two-point probe method. A Keithley 2000 multimeter and Keithley 224 programmable current source (Cleveland, Ohio) are used to carry out the measurements. An S & A Engineering 4220AQ thermal test chamber (Scottsdale, Ariz.) is used to achieve the three measurement temperatures. Sheet resistance data is reported as ohms/square at 25° C. Cold temperature coefficient of resistance ("CTCR") is defined as $[(R_{-55°C.} - R_{25°C.})/(R_{25°C.} \times \Delta T)] \times 1,000,000$. Hot temperature coefficient of resistance ("HTCR") is defined as $[(R_{125°C.} - R_{25°C.})/(R_{25°C.} \times \Delta T)] \times 1,000,000$. The units of both HTCR and CTCR are ppm/° C.

|  | Sample A (14% conductive) | Sample B (16% conductive) |
| --- | --- | --- |
| Sheet resistance (ohms/sq.) | 4679655 | 116117 |
| HTCR (ppm/° C.) | −239 | 15 |
| CTCR (ppm/° C.) | −354 | −45 |
| HTCR − CTCR | 115 | 60 |

This data indicate that a 100 kilohm/sq. resistor prepared from a composition that includes a $Li_2RuO_3$ composition as described herein would have an H/CTCR of +10/−40 ppm/° C., which is well within the usual ±100 ppm specification limit for thick-film resistor compositions.

Control A: Direct Synthesis of $Al_{0.333}LiRuO_3$ $Al_2O_3$, $Li_2CO_3$, and $RuO_2$ were dried at 100° C. overnight before use. 8.497 g $Al_2O_3$, 18.473 g $Li_2CO_3$, and 66.535 g $RuO_2$ were put into a 1 liter rubber-lined milling jar half full of ⅜" media (1700 g). The jar was rolled at 80 rpm for 24 hours. The contents were sieved to remove the media, and the powder was placed into shallow alumina trays. The trays were heated at 1000° C. for 12 hours in air. Powder X-ray diffraction showed the presence of $AlLiO_2$, $RuO_2$, and $Li_2RuO_3$. The characteristic line at ~19° 2θ, which would indicate Al-doping of $Li_2RuO_3$, was not present.

What is claimed is:

1. A composition comprising particles of $Li_2RuO_3$ in which Li atoms have been exchanged for Mg atoms.

2. A composition according to claim 1 in which at least 50 mol % of the Li atoms have been exchanged.

3. A composition according to claim 1 in which at least 75 mol % of the Li atoms have been exchanged.

4. A composition according to claim 1 wherein a $Li_2RuO_3$ particle comprises first and second layers, and more Li atoms are exchanged in the first layer than in the second layer.

5. A composition according to claim 4 wherein less than 20% of the Li atoms in the second layer are exchanged.

6. A composition according to claim 4 wherein the first and second layers are adjacent.

7. A composition according to claim 4 wherein more than 80% of the Li atoms in the first layer are exchanged.

8. A composition according to claim 1 that is described by formula as follows: $Mg_yLi_{2-2y}RuO_3$ where $(2y) \leq 1.5$.

9. A composition according to claim 8 further comprising one or both of an alkali metal, zinc alumino-borosilicate frit, and an alkaline-earth metal, zinc alumino-borosilicate frit.

10. A resistor comprising a composition according to claim 9.

11. A resistor according to claim 10 that has a sheet resistance of about 100 kilohms per square to about 10 megohms per square, and/or a TCR of ±100 ppm/° C.

12. An electronic device comprising a resistor according to claim 10.

13. A composition according to claim 1 further comprising one or both of an alkali metal, zinc alumino-borosilicate frit, and an alkaline-earth metal, zinc alumino-borosilicate frit.

14. A resistor comprising a composition according to claim 13.

15. A resistor according to claim 14 that has a sheet resistance of about 100 kilohms per square to about 10 megohms per square, and/or a TCR of ±100 ppm/° C.

16. An electronic device comprising a resistor according to claim 14.

* * * * *